United States Patent Office 3,657,414

Patented Apr. 18, 1972

3,657,414

FORMULATION OF A BOLL WEEVIL FEEDING STIMULANT MIXTURE

Paul A. Hedin and Lavenia R. Miles, Starkville, James P. Minyard, State College, and Alonzo C. Thompson, Starkville, Miss., assignors to the United States of America as represented by the Secretary of Agriculture

No Drawing. Filed Feb. 10, 1969, Ser. No. 798,107

**Int. Cl. A01n *17/14***

U.S. Cl. 424—84 11 Claims

ABSTRACT OF THE DISCLOSURE

Several formulations have been prepared from a group of 52 organic chemical stimulants of certain insects. The formulations can include select biological agents, such as insecticides, in unique formulations which serve as "poison bait" to insects such as the boll weevil. These can generally be dispensed by ordinary means, such as sprays or pellets, which would kill the offending insect without damaging the plants thus treated. A ratio of inactive vessel to active ingredient of 200 to 1, respectively, has been found suitable for most applications.

A non-exclusive, irrevocable, royalty-free license in the invention herein described, throughout the world for all purposes of the United States Government, with the power to grant sublicenses for such purposes, is hereby granted to the Government of the United States of America.

This invention relates to a method of exterminating the boll weevil (*Anthonomus grandis* Boheman) and the like insects by administering biological agents, such as insecticides, in mixture with certain ingredients which serve as "poison bait." Specifically, this invention relates to the preparation of unique mixtures of chemically defined compounds which stimulate puncturing and/or feeding by the boll weevil. More specifically this invention relates to the preparation of multicomponent mixtures of organic substances which were selected from known insect stimulants and mixed with known insecticides in diluents wherein the stimulants to insecticide to diluent ratio is about from 1:1:2000 to 1:1:100. These unique formulations are very useful in preventing the propagation of such insects as the boll weevil in cotton fields.

The main object of the instant invention is to provide a means of exterminating certain insects which have in the past been very damaging to agricultural crops. In particular, this invention concerns the extermination of the boll weevil in cotton fields.

Another object of the instant invention is to provide a novel and more efficient means for exterminating the boll weevil, an improvement over known methods of accomplishing the said goal.

A third object of the instant invention is to provide formulations to facilitate administration of sufficient quantities of agents that kill, sterilize, or spread disease.

A fourth object of the instant invention is to provide formulations which when employed will permit restricted usage of insecticides and thus lessen public health problems due to residues.

The boll weevil which is the most serious pest of cotton in the United States oviposits in the flower bud. The feeding by the developing larvae eventually results in abscission, and consequently decreased yield of fruit. For years insecticides have been used to control the insect population. While insecticides are still reasonably effective in controlling insect populations, the number of applications and level per acre required for control have increased as insect populations are selected by survival which are resistant. The bait principle has been, and is presently, under investigation. Keller et al., in an article in J.

Economic Entomology, 55, p. 80 (1962), observed that aqueous bud extracts stimulated feeding by this insect. R. E. McLaughlin reported in the J. Econ. Ent., 59, p. 909 (1966) that he was successful in infecting the boll weevil with *Mattesia grandis* by incorporating spores of this sporozoan in bud extract-sugar-agar gels. Daum et al. incorporated cottonseed oil and dye markers in viscous gelating formulations to demonstrate feeding of this insect on the preparations in the presence of growing cotton, and this work was reported in vol. 60 of the said journal. However, dependence on such aqueous extracts and cottonseed oil limits the applicability because of cost, instability of the preparations, and difficulty of formulation.

Isolational studies by us led to the conclusion that no single compound in the bud evokes a full puncturing response by this insect. Feeding activity can be elicited with each of a series of successive solvent extractions of increasing polarity. Subsequent fractionation implicated several compound classes, but activity was decreased or even disappeared with the isolation of pure components.

Since recombination of fractions or fortification of fractions by sugars and buffers often rejuvenated part of the activity, efforts were directed to formulate a feeding active mixture from known cotton constituents, common metabolites and primary mammalian flavor and odor compounds. By screening procedures and isolational work, we identified 52 compounds including 14 previously reported in cottom which give responses at least 30% as great as aqueous bud extracts when assayed individually. They are listed in decreasing order of activity as follows: gossypol acetate, menthone, cineole, 15-pentadecanolide, phytosterol, benzylamine, ferulic acid, α-keto glutaric acid, α-keto butyric acid, dihydroxyacetone, L-menthol, malonic acid, mandelic acid, styrene glycol, uric acid, vanillin, beta-phenyl ethyl methyl ethyl carbinol maltol, 2 aminoethanol, adipic acid, anthranilic acid, DL alpha tocopherol, n-butylamine, calcium cyclamate, trans-cinnamic acid, cyclopentadecanone, N,N-dimethyl-aniline, ethyl beta methylbeta phenyl glycidate, folic acid, formic acid, gossypol (free), lactic acid, lanosterol, 1 malic acid, mannitol, methionine, phosphate buffer (pH 7.0), phosphatidyl serine, pyruvic acid, pyruvaldehyde, quercetin, beta-sitosterol, succinic acid, terephthalic acid, theobromine, thyroxin (Na), vanillic acid, valine, phytic acid, quercetin-7-glucoside, quercetin-3′-glucoside, and cyanidin-3-glucoside.

Since none of these gave responses as great as aqueous bud extracts and were not directly competitive with them, the compounds were grouped for comparison according to mammalian flavor and odor responses, functional groups and molecular weights. Insects appeared stimulated by fairly high molecular weight sweet substances, low molecular weight sour substances and cooling substances. Bitter, salty, biting and pungent compounds were accepted in limited concentrations. Individually active compounds representing these categories were formulated in multicomponent mixtures. The operation of a compatibility factor became evident since some individually active components appeared to behave unfavorably in mixtures whereas others had a high frequency of occurrence in the most active mixtures.

From this, 3 multicomponent mixtures were selected as most active. They are (A) beta-sitosterol, N,N-dimethylaniline, 1,8-cineole, vanillin, mannitol, rhamnose, 0.1 M phosphate buffer, pH 7.0, each in equal weight proportions, and 0.01 proportion by weight of 15-pentadecanolide (B) beta-sitosterol, vanillin, gossypol acetate, methionine, mannitol, rhamnose, and 0.1 M phosphate buffer, pH 7.0, and (C) alpha-ketoglutaric acid, 15-pentadecanolide 1/100X, beta-sitosterol, vanillin, gossypol acetate, rhamnose, mannitol, and 0.1 M phosphate buffer, pH 7.0. For each assay, 31.6 μg. of each except 15-pentadecanolide (0.315 μg.) was employed.

These and other similar related synthetic mixtures were compared with the previously described cottonseed oil and bud extract in direct preference tests. Thirty-seven of 49 mixtures elicited a greater number of feeding puncture than did the oil and the overall ratio of feeding punctures of mixtures to oil was 2.2/1. Twenty-two of 37 mixtures elicited a greater number of feeding punctures than did the bud extract and the overall ratio of feeding punctures of mixtures to bud extract was 1.2/1.

The data therefore indicate that synthetic mixtures can be formulated which are superior to cottonseed oil and competitive with bud extracts for stimulation of insect puncturing. It is probable that mixtures can be improved by further screening efforts.

A more detailed report of the work which led to the method for eradicating the boll weevil and the formulations considered and tried can be found in the Journal of Agricultural and Food Chemistry under the title "Constituents of the Cotton Bud. Formulation of a Boll Weevil Feeding Stimulant Mixture," by P. A. Hedin et al., vol. 16, No. 3, May-June 1968, pp. 505–513.

To summarize, the instant invention is both (I) a method and (II) a plurality of formulations. The method is for eradicating the boll weevil *Anthonomus grandis*, while the formulations are compounded from three groups of substances, these substances being feeding stimulants, common metabolites and primary mammalian odor and flavor compounds. In general, the invention can best be described as:

(I) A boll weevil-eradicating method comprising:

(a) Mixing in equal weight proportions a plurality of chemical substances selected from feeding stimulants from cotton constituents (I) common metabolites (II), and primary mammalian odor and flavor compounds (III) selected from the group consisting of:

beta-sitosterol (I),
N,N-dimethylaniline (III),
1,8-cineole (II) and (III),
vanillin (III),
mannitol (II) and (III),
rhamnose (I),
gossypol acetate (I),
methionine (I) and (II),
alpha-ketoglutaric acid (I) and (II), and
1/100 weight of 15-pentadecanolide (III)

(b) dissolving the mixture from (a) in 50—50 aqueous methanol, (c) Buffering the dilute mixture to a pH of about 7.0 with a phosphate buffer, (d) Adding an insect-control agent selected from the group consisting of toxaphene, DDT, methyl parathion, apholate, and *Mattesia grandis* spores, and (e) Applying to the immature cotton plant this boll weevil-eradicating formulation which stimulates the feeding instinct of this and other insects whereby the puncturing of the cotton bowl by the insect will cause its death, thereby the formulation constituting "poison bait."

(II) A plurality of boll weevil-eradicating formulations of ingredients comprising feeding stimulants from cotton constituents, common metabolites, and primary mammalian odor and flavor compounds which when applied to the immature cotton plant constitute "poison bait" for the boll weevil *Anthonomus grandis* and the like insects; said poison bait containing in equal weight proportions these ingredients:

beta-sitosterol,
N,N-dimethylaniline,
1,8-cineole,
vanillin,
mannitol,
rhamnose, and
1/100 weight of 15-pentadecanolide or beta-sitosterol,
vanillin,
mannitol,
rhamnose,
gossypol acetate, and
methionine or beta-sitosterol,
vanillin,
mannitol,
rhamnose,
gossypol acetate,
alpha-ketoglutaric acid, and
1/100 weight of 15-pentadecanolide dissolved in 50—50 aqueous methanol, buffered to a pH of about 7.0 with a phosphate buffer, and containing also about from 1% to 3% of an insect-control agent (based on the weight of any of the ingredients) selected from the group consisting of toxaphene, DDT, methyl parathion, apholate, and *Matttesia grandis* spores. When this boll weevil eradicating formulation is to be applied to the immature cotton plant, it is first diluted with the aforesaid 50—50 aqueous methanol so as to dispense the resulting diluted formulation on the cotton plant in an ingredient to insect-control agent to aqueous methanol diluent ratio of 1:1:2000 to 1:1:100, respectively.

The following examples while here presented to illustrate some preferred embodiments should not be construed as limiting the invention in any manner. There is a large quantity of formulations which can be prepared under the scope of our invention, in fact, too numerous to illustrate.

EXAMPLE 1

A control formulation was prepared by mixing the following ingredients in the indicated quantities: Beta-sitosterol, N,N-dimethylaniline, 1,8-cineole, vanillin, mannitol, rhamnose, 0.1 M phosphate buffer, pH 7.0, each in equal weight proportions, and 0.01 proportion by weight (0.316 μg.) of 15-pentadecanolide, was applied in a 1% volume aqueous methanol solution to chromatographic paper squares (1 inch). The papers were wrapped around agar gel cylinders and presented to insects housed in petri dishes. Over a 4-hour period, 10 insects made an average of 8.7 punctures in the paper coated cylinders whereas an average of 10.0 punctures was made in cylinders treated with water extracts of cotton buds. When insects were given a choice between cylinders impregnated with the described mixture of cottonseed oil, the synthetic mixture was highly preferred in 37 of 49 tests by a ratio of 2.2 to 1. When insects were given a choice between cylinders impregnated with the attractant formulation mixture and aqueous extracts of cotton, the attractant formulation mixture was preferred in 22 of 37 tests by a ratio of 1.2 to 1.

EXAMPLE 2

The methods and supplies of Example 1 were employed in preparing the following mixture which consisted of β-sitosterol, vanillin, gossypol acetate, methionine, mannitol, rhamnose, and phosphate buffer, pH 7.0 each in equal weight proportions. Comparable results to Example 1 were obtained.

EXAMPLE 3

The methods and supplies of Example 1 were employed in preparing the following mixture which consisted of alphaketoglutaric acid, β-sitosterol, vanillin, gossypol acetate, rhamnose, mannitol, and phosphate buffer, pH 7.0, each in equal weight proportions and 0.01 proportion by weight 15-pentadecanolide. Comparable results, to Example 1 were obtained.

We claim:

1. A boll weevil-eradicating formulation for application to the immature cotton plant, said formulation consisting of equal weight proportions of the ingredients beta-sitosterol,
N,N-dimethylaniline,
1,8-cineole,
vanillin,
mannitol,
rhamnose, and
1/100 weight of 15-pentadecanolide, dissolved in 50—50 aqueous methanol, buffered to a pH of about 7.0 with a phosphate buffer, and containing also, about from 1% to 3%, based on the weight of any of said ingredients, of an insect-control agent selected from the group consisting of toxaphene, DDT, methyl parathion, apholate, and *Mattesia grandis* spores, said formulation, prior to its application to the immature cotton plant, being diluted with said 50—50 aqueous methanol so as to dispense the formulation onto the immature cotton plant in an ingredient to insect-control agent to aqueous methanol diluent ratio of from 1:1:2000 to 1:1:100, respectively.

2. The formulation of claim 1 wherein the insect-control agent is toxaphene.

3. The formulation of claim 1 wherein the insect-control agent is DDT.

4. The formulation of claim 1 wherein the insect-control agent is methyl parathion.

5. A boll weevil-eradicating formulation for application to the immature cotton plant, said formulation consisting of equal weight proportions of the ingredients beta-sitosterol,
vanillin,
mannitol,
rhamnose,
gossypol acetate, and
methionine, dissolved in 50—50 aqueous methanol, buffered to a pH of about 7.0 with a phosphate buffer, and containing also, about from 1% to 3%, based on the weight of any of said ingredients, of an insect-control agent selected from the group consisting of toxaphene, DDT, methyl parathion, apholate, and *Mattesia grandis* spores, said formulation, prior to its application to the immature cotton plant, being diluted with said 50—50 aqueous methanol so as to dispense the formulation onto the immature cotton plant in an ingredient to insect-control agent to aqueous methanol diluent ratio of from 1:1:2000 to 1:1:100, respectively.

6. The formulation of claim 5 wherein the insect-control agent is apholate.

7. A boll weevil-eradicating formulation for application to the immature cotton plant, said formulation consisting of equal weight proportions of the ingredients beta-sitosterol,
vanillin,
mannitol,
rhamnose,
gossypol acetate,
alpha-ketoglutaric acid, and
1/100 weight of 15-pentadecanolide, dissolved in 50—50 aqueous methanol, buffered to a pH of about 7.0 with a phosphate buffer, and containing also, about from 1% to 3%, based on the weight of any of said ingredients, of an insect-control agent selected from the group consisting of toxaphene, DDT, methyl parathion, apholate, and *Mattesia grandis* spores, said formulation, prior to its application to the immature cotton plant, being diluted with said 50—50 aqueous methanol so as to dispense the formulation onto the immature cotton plant in an ingredient to insect-control agent to aqueous methanol diluent ratio of from 1:1:2000 to 1:1:100, respectively.

8. The formulation of claim 7 wherein the insect-control agent is *Mattesia grandis* spores.

9. A method of eradicating the boll weevil *Anthonomus grandis* comprising applying to the surface of the immature cotton plant the formulation of claim 1, diluted as specified therein, to attract the boll weevil, through the ingredients of said formulation, to its normal feeding habitat and to stimulate the boll weevil into puncturing the walls of the cottonseed in order to proceed towards and reach its normal source of nourishment and eventually ingest the insect-control agent which forms part of the formulation.

10. A method of eradicating the boll weevil *Anthonomus grandis* comprising applying to the surface of the immature cotton plant the formulation of claim 5, diluted as specified therein, to attract the boll weevil, through the ingredients of said formulation, to its normal feeding habitat and to stimulate the boll weevil into puncturing the walls of the cotton seed in order to proceed towards and reach its normal source of nourishment and eventually ingest the insect-control agent which forms part of the formulation.

11. A method of eradicating the boll weevil *Anthonomus grandis* comprising applying to the surface of the immature cotton plant the formulation of claim 7, diluted as specified therein, to attract the boll weevil, through the ingredients of said formulation, to its normal feeding habitat and to stimulate the boll weevil into puncturing the walls of the cottonseed in order to proceed towards and reach its normal source of nourishment and eventually ingest the insect-control agent which forms part of the formulation.

References Cited

UNITED STATES PATENTS

| | | | |
|---|---|---|---|
| 1,540,649 | 6/1925 | Power | 424—84 |
| 3,207,661 | 9/1965 | Curtis et al. | 424—84 |
| 3,249,500 | 5/1966 | Lund | 424—84 |
| 3,325,355 | 6/1967 | Goodhue | 424—84 |

OTHER REFERENCES

Journal Economic Entomology, vol. 55, #5, October 1962, pp. 800–801.

Journal Economic Entomology, vol. 56, #4, August 1963, pp. 445–446.

Journal Economic Entomology, vol. 59, #4, August 1966, pp. 909–911.

ALBERT T. MEYERS, Primary Examiner
F. E. WADDELL, Assistant Examiner

U.S. Cl. X.R.

424—DIG 12, 93, 200, 218, 352, 354